(12) United States Patent
Sugimoto

(10) Patent No.: US 9,145,135 B2
(45) Date of Patent: Sep. 29, 2015

(54) HYBRID VEHICLE

(71) Applicant: Hitoki Sugimoto, Toyota (JP)

(72) Inventor: Hitoki Sugimoto, Toyota (JP)

(73) Assignee: Toyota Jidosha Kabushika Kaisha, Toyota-shi (JP)

( * ) Notice: Subject to any disclaimer, the term of this patent is extended or adjusted under 35 U.S.C. 154(b) by 0 days.

(21) Appl. No.: 13/827,933

(22) Filed: Mar. 14, 2013

(65) Prior Publication Data

US 2013/0261859 A1  Oct. 3, 2013

(30) Foreign Application Priority Data

Mar. 28, 2012 (JP) .................. 2012-072988

(51) Int. Cl.
| | |
|---|---|
| *B60W 20/00* | (2006.01) |
| *B60W 10/06* | (2006.01) |
| *F02D 41/08* | (2006.01) |
| *F02D 41/12* | (2006.01) |
| *F02D 31/00* | (2006.01) |

(52) U.S. Cl.
CPC .............. *B60W 20/40* (2013.01); *B60W 10/06* (2013.01); *B60W 20/1082* (2013.01); *B60W 20/50* (2013.01); *B60W 2600/00* (2013.01); *B60W 2710/065* (2013.01); *B60W 2710/0627* (2013.01); *F02D 31/003* (2013.01); *F02D 41/08* (2013.01); *F02D 41/123* (2013.01); *Y10S 903/903* (2013.01)

(58) Field of Classification Search
CPC .......... B60W 10/06; B60W 2710/065; B60W 2710/0627; B60W 20/108; F02D 41/04; F02D 41/123; F02D 41/126; Y02T 10/40; Y02T 10/44; Y02T 10/47; Y02T 10/48
See application file for complete search history.

(56) References Cited

U.S. PATENT DOCUMENTS

| | | | | | |
|---|---|---|---|---|---|
| 4,022,164 | A | * | 5/1977 | Fuchs ..................... | 123/339.14 |
| 5,201,250 | A | * | 4/1993 | Kato et al. .................... | 477/109 |
| 5,309,887 | A | * | 5/1994 | Kondo et al. ............. | 123/568.16 |
| 6,002,979 | A | * | 12/1999 | Ishizu ............................ | 701/86 |
| 6,009,371 | A | * | 12/1999 | Kobayashi .................... | 701/112 |
| 6,217,477 | B1 | * | 4/2001 | Nobumoto et al. ............. | 477/43 |
| 6,394,069 | B1 | * | 5/2002 | Kondo .................... | 123/339.19 |
| 6,600,998 | B1 | * | 7/2003 | Majima et al. ................. | 702/24 |

(Continued)

FOREIGN PATENT DOCUMENTS

| | | |
|---|---|---|
| JP | 11-107834 A | 4/1999 |
| JP | 2005-042561 A | 2/2005 |

(Continued)

*Primary Examiner* — John R Olszewski
*Assistant Examiner* — Tommy Worden
(74) *Attorney, Agent, or Firm* — Gifford, Krass, Sprinkle, Anderson & Citkowski, P.C.

(57) ABSTRACT

The hybrid vehicle executes a diagnosis of a component related to exhaust qualities during a fuel-cut operation of the internal combustion engine and generates a fuel-cut request to execute the diagnosis. When the internal combustion engine is operated in an idle state, the hybrid vehicle feedback-controls a throttle valve opening (control parameter) such that an engine rotation speed is maintained at a target idle rotation speed, and learns a value corresponding to the control parameter as a learned value for controlling the idle operation in a state where the vehicle speed is not more than a learning permission vehicle speed and the internal combustion engine is operated in the idle state. The hybrid vehicle continues generation of the fuel-cut request until the learning of the idle operation control learned value is completed.

2 Claims, 7 Drawing Sheets

(56) References Cited

U.S. PATENT DOCUMENTS

| | | | |
|---|---|---|---|
| 6,752,225 B2* | 6/2004 | Kojima | 180/65.25 |
| 6,840,213 B2* | 1/2005 | Takahashi et al. | 123/325 |
| 7,277,781 B2* | 10/2007 | Cawthorne et al. | 701/22 |
| 2004/0221832 A1* | 11/2004 | Takahashi et al. | 123/339.15 |
| 2005/0016781 A1 | 1/2005 | Muta | |
| 2007/0163234 A1* | 7/2007 | Ando et al. | 60/277 |
| 2010/0050602 A1* | 3/2010 | Fujimoto | 60/277 |
| 2010/0076635 A1* | 3/2010 | Sugimoto | 701/22 |
| 2010/0145562 A1* | 6/2010 | Moran | 701/22 |
| 2011/0259308 A1* | 10/2011 | Kato | 123/690 |

FOREIGN PATENT DOCUMENTS

| | | |
|---|---|---|
| JP | 2005-207376 A | 8/2005 |
| JP | 2006-194215 A | 7/2006 |
| JP | 2007-283899 A | 11/2007 |

* cited by examiner

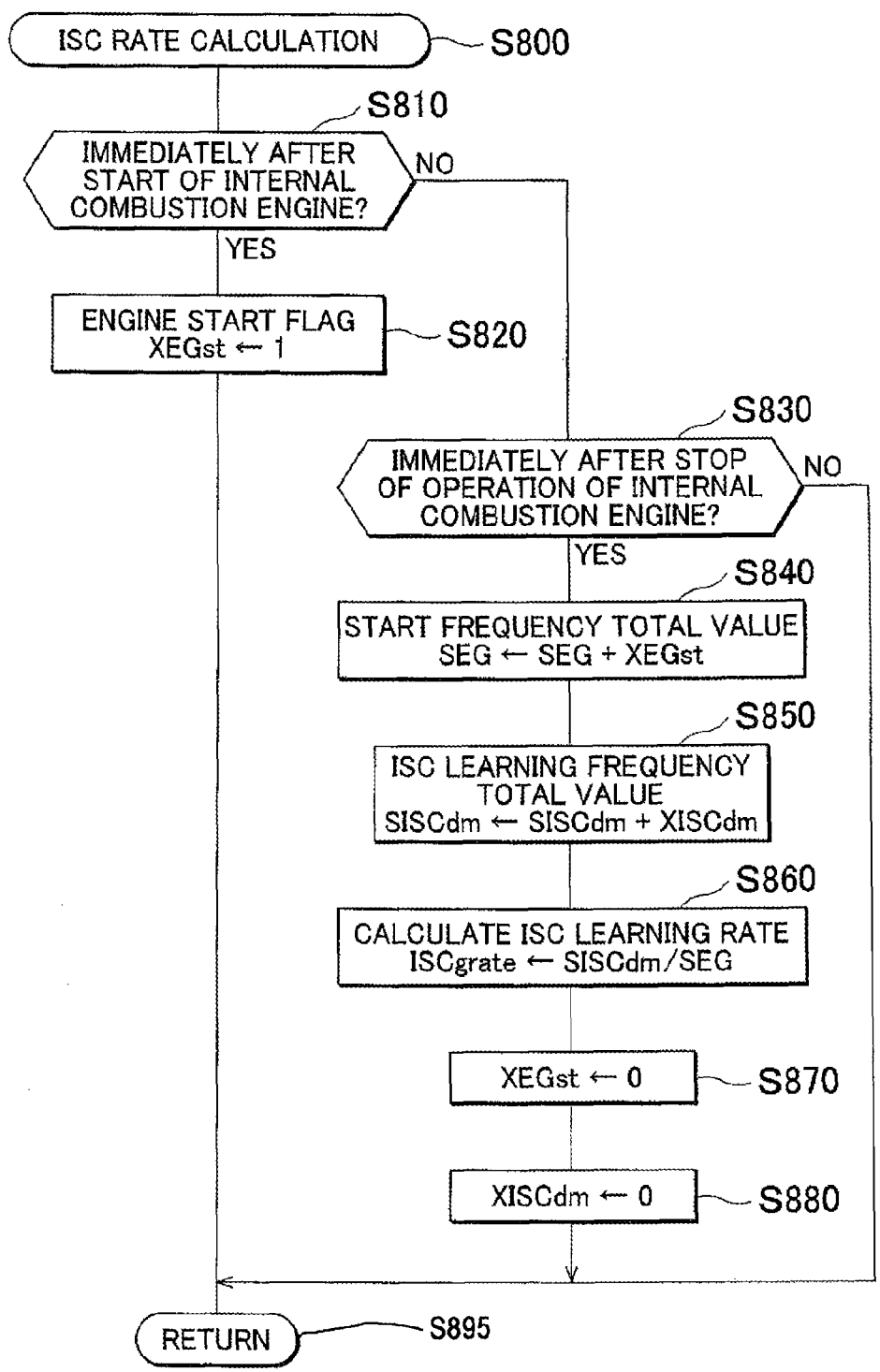

HYBRID VEHICLE

INCORPORATION BY REFERENCE

The disclosure of Japanese Patent Application No. 2012-072988 filed on Mar. 28, 2012 including the specification, drawings and abstract is incorporated herein by reference in its entirety.

BACKGROUND OF THE INVENTION

1. Field of the Invention

The invention relates to a hybrid vehicle (HV) on which an internal combustion engine and a motor are mounted as drive sources.

2. Description of Related Art

A HV is capable of electric running and hybrid running. The electric running is a running in which the operation of an internal combustion engine is stopped and only the output of a motor is used. The hybrid running is a running in which the outputs of both of the internal combustion engine and the motor are used.

More specifically, the HV starts the engine to thereby start the hybrid running when "vehicle request power that changes according to an accelerator operation amount and a vehicle speed" becomes equal to or more than "an engine start power threshold value". In addition, the HV stops the operation of the engine and performs the electric running when the vehicle request power becomes equal to or less than an engine stop power threshold value during the hybrid running. That is, the HV performs the operation of the engine when the engine can be efficiently operated and/or when a sufficient vehicle driving force cannot be obtained only with the motor. On the other hand, the HV stops the operation of the engine when the engine cannot be efficiently operated and/or when the sufficient vehicle driving force can be obtained only with the motor (see, e.g., Japanese Patent Application Publication No. 2005-42561 (JP-2005-42561 A)). Thus, the HV intermittently operates the engine. That is, the HV executes "an intermittent operation of the engine".

The HV has an electric power storage device (e.g., a battery) that can supply electric power to the motor and can be charged. Further, in recent years, a plug-in HV has been developed. In the plug-in HV, the electric power storage device can be charged with electric power supplied from the outside of the vehicle. Hereinbelow, charging of the electric power storage device with the electric power supplied from the outside of the vehicle is referred to as "external charging".

When the external charging is performed, the electric power storage device is almost fully charged in many cases so that the remaining capacity of the electric power storage device is large. Consequently, the HV runs in an EV (Electric Vehicle) mode (CD mode: Charge Depleting mode) until the remaining capacity of the electric power storage device is reduced to a mode switching threshold value after the external charging. The EV mode is a mode in which the electric running has higher priority than the hybrid running. Thereafter, when the remaining capacity of the electric power storage device becomes equal to or smaller than the mode switching threshold value, the HV runs in an HV mode (CS mode: charge sustaining mode).

For example, in the EV mode, the engine start power threshold value and the engine stop power threshold value are set to be higher than those in the HV mode. Further, for example, an intermittent operation permission vehicle speed in the EV mode is set to be higher than that in the HV mode. The intermittent operation permission vehicle speed is a vehicle speed that permits the intermittent operation. Consequently, in the EV mode, there are cases where the operation of the engine is stopped even when the vehicle speed is considerably high.

As can be seen from the foregoing, in the HV, the frequency of non-operation of the engine is high. In addition, for example, in a case where, even when the operation of the engine is started especially in the EV mode, the engine is operated in an idle state (idle operation) because of the small vehicle request power, the operation of the engine is stopped at the time point at which the vehicle speed becomes equal to or lower than the intermittent operation permission vehicle speed. In the HV, there are cases where the idle operation of the engine is performed when a condition for a specific idle operation such as the idle operation for accelerating the warm-up of a catalyst or performing air conditioning of a vehicle compartment is satisfied.

There is available an ISC (idle speed control) system in which, when the engine is operated in the idle state, "a control parameter that adjusts the rotation speed of the engine (e.g., a throttle valve opening)" is feedback-controlled such that the rotation speed of the engine is maintained at a target idle rotation speed. In the ISC system, when the engine is operated in the idle state, a value corresponding to the control parameter is learned as an idle operation control learned value.

In a case where the engine provided with the ISC system is mounted on the HV, when the vehicle speed is higher than a predetermined learning permission vehicle speed, the learning of the idle operation control learned value is prohibited even when the engine is operated in the idle state. The learning of the idle operation control learned value is permitted only when the vehicle speed is not more than the predetermined learning permission vehicle speed. This is for executing the learning of the idle operation control learned value in the more stable idle operation state. The learning permission vehicle speed is lower than the above-described intermittent operation permission vehicle speed.

However, as described above, the frequency of start of the engine is low in the HV. In addition, even if the engine is started, it is rarely the case that the vehicle speed is reduced to the learning permission vehicle speed or lower while the engine maintains the idle operation state. This is because the vehicle request power in a case where the engine is operated in the idle state is less than the engine stop power threshold value, and hence the operation of the engine is stopped at the time point at which the vehicle speed becomes equal to or lower than the intermittent operation permission vehicle speed. As a result, in the HV, opportunity for learning of the idle operation control learned value is limited.

SUMMARY OF THE INVENTION

The invention provides a HV capable of increasing opportunity for learning of an idle operation control learned value by utilizing a fuel-cut request generated in order to perform a self-diagnosis of a component related to exhaust performance.

An aspect of the HV according to the invention is a HV on which an internal combustion engine and a motor are mounted as drive sources, and the HV includes a drive control section, a self-diagnosis section, a fuel-cut request section, and an idle operation control section.

The drive control section stops the internal combustion engine when a predetermined stop condition is satisfied in a case where a vehicle speed of the HV is not more than a predetermined first vehicle speed. In addition, the drive control section starts the internal combustion engine when a predetermined start condition is satisfied and controls a torque generated by the internal combustion engine and a torque generated by the motor.

The self-diagnosis section executes a diagnosis of a component related to an exhaust quality of the internal combustion engine during a fuel-cut operation of the engine.

The fuel-cut request section generates to the drive control section a fuel-cut request for operating the internal combustion engine in a fuel-cut state in order to execute the diagnosis.

The idle operation control section feedback-controls a control parameter that adjusts a rotation speed of the internal combustion engine such that the rotation speed of the internal combustion engine is maintained at a target idle rotation speed in a case where the internal combustion engine is operated in an idle state by the drive control section.

Further, the idle operation control section learns a value corresponding to the control parameter as a learned value for controlling the idle operation in a state in which the vehicle speed is not more than "a predetermined second vehicle speed lower than the first vehicle speed". The idle operation control learned value is used for, e.g., determining the control parameter at the time of start of the feedback control.

In addition, the fuel-cut request section continues to generate the fuel-cut request until the learning is completed. The drive control section continues the fuel-cut operation of the internal combustion engine in a case where the fuel-cut request is generated even when the engine operation stop condition is satisfied.

As a result, in a case where the fuel-cut operation is performed for the self-diagnosis, even when the engine operation stop condition is satisfied, the engine is operated in the fuel-cut state until the learning of the idle operation control learned value is completed and the operation of the engine is not stopped. Consequently, when the fuel-cut operation is ended, the engine is operated in the idle state, and hence it is possible to increase opportunity of executing the learning of the idle operation control learned value.

Other objects, other features, and accompanying advantages of the invention will be easily understood from the description of an embodiment of the invention given below with reference to the drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a flowchart showing a routine executed by the CPU of the engine ECU shown in FIG. 1.

DETAILED DESCRIPTION OF EMBODIMENTS

Figure 1:
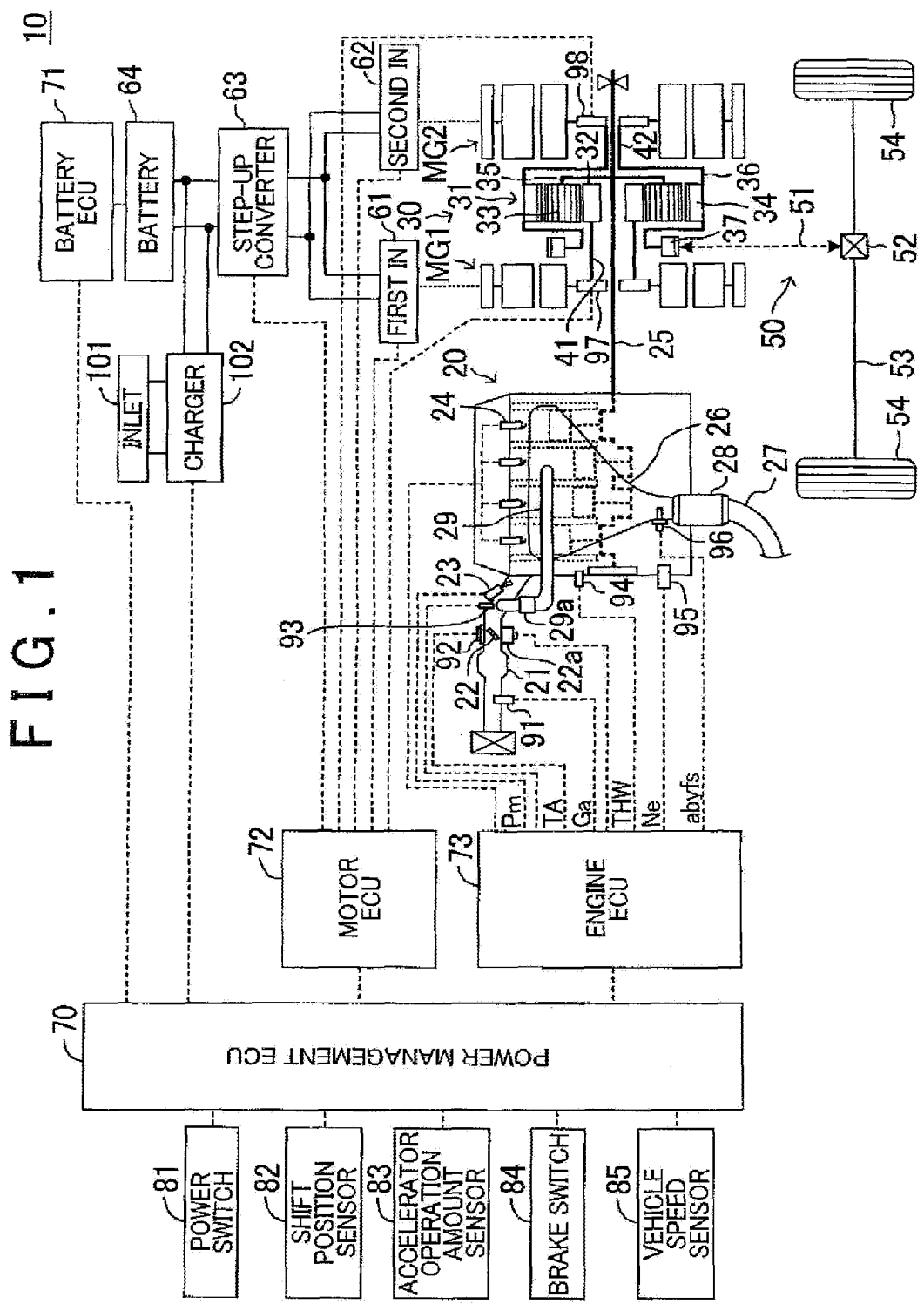
FIG. 1 is a schematic diagram of a HV according to an embodiment of the invention.

Hereinbelow, a description will be given of a vehicle according to an embodiment of the invention with reference to the drawings. As shown in FIG. 1, a vehicle 10 according to the embodiment of the invention is a HV (plug-in HV). The vehicle 10 is capable of running in each of "an EV mode (CD mode, first running mode) and an HV mode (CS mode, second running mode)".

As shown in FIG. 1, the HV 10 according to the embodiment of the invention has a first motor generator (MG)1, a second MG2, an internal combustion engine 20, a power dividing mechanism 30, a driving force transmission mechanism 50, a first inverter 61, a second inverter 62, a step-up converter 63, a battery 64, a power management ECU 70, a battery ECU 71, a motor ECU 72, and an engine ECU 73.

The ECU is an electronic control circuit that has, as a main component, a microcomputer including a CPU, a ROM (read-only memory), a RAM (random access memory), a backup RAM (or a nonvolatile memory), and an interface. The backup RAM is capable of storing data irrespective of ON or OFF of an ignition key switch (not shown) of the vehicle 10.

The first MG1 is a synchronous MG capable of functioning as a generator and a motor. The first MG1 functions mainly as the generator in the embodiment. The first MG1 includes an output shaft (hereinafter referred to as "a first shaft") 41.

Similarly to the first MG1, the second MG2 is a synchronous MG capable of functioning as the generator and the motor. The second MG2 functions mainly as the motor in the embodiment. The second MG2 includes an output shaft (hereinafter also referred to as "a second shaft") 42.

The engine 20 is a four-cycle spark ignition multi-cylinder internal combustion engine. The engine 20 includes an intake passage portion 21, a throttle valve 22, a throttle valve actuator 22a, a plurality of fuel injection valves 23, a plurality of ignition devices 24 including spark plugs, a crankshaft 25 as the output shaft of the engine 20, an exhaust manifold 26, an exhaust pipe 27, a three-way catalyst 28, an EGR (exhaust gas recirculation) passage portion 29, and an EGR valve 29a. The intake passage portion 21 includes an intake pipe and an intake manifold. The three-way catalyst 28 is disposed on the upstream side of the exhaust pipe 27. The engine 20 may include a VVT (variable valve timing) system and a downstream-side three-way catalyst that are not shown.

The throttle valve 22 is rotatably supported in the intake passage portion 21. The throttle valve actuator 22a rotates the throttle valve 22 in response to a command signal from the engine ECU 73. With this, the throttle valve actuator 22a is capable of changing the cross-sectional area of the passage of the intake passage portion 21.

Each of the plurality of fuel injection valves 23 is disposed such that the injection hole of the fuel injection valve 23 is exposed to an intake port communicating with each combustion chamber. The fuel injection valve 23 injects fuel in a command fuel injection amount included in a fuel injection command signal into the intake port in response to the fuel injection command signal.

Each of the plurality of ignition devices 24 generates an ignition spark in the combustion chamber of each cylinder at a predetermined timing in response to a command signal from the engine ECU 73.

The upstream-side three-way catalyst 28 is an exhaust gas purification catalyst, and is disposed in the exhaust gas collecting portion of the exhaust manifold 26. The downstream side of the upstream-side three-way catalyst 28 is connected to the exhaust pipe 27. That is, the catalyst 28 is disposed in the exhaust passage of the engine 20. The upstream-side three-way catalyst 28 purifies unburned components (HC (hydrocarbon), CO (carbon monoxide) and the like), and NOx (nitrogen oxides) discharged from the engine 20.

The EGR passage portion 29 connects the exhaust manifold 26 and the intake passage portion 21 at a position on the downstream side of the throttle valve 22. The EGR valve 29a is disposed in the EGR passage portion 29. The EGR valve 29a changes the cross-sectional area of the flow path of the EGR passage portion 29 in response to the command signal from the engine ECU 73.

The throttle valve actuator 22a changes the opening of the throttle valve 22, and the engine 20 thereby changes an intake air amount and a fuel injection amount. With these operations, it is possible to change "an output torque and an engine rotation speed (i.e., an engine output)" of the engine 20.

The power dividing mechanism 30 has a conventional planetary gear device 31. The planetary gear device 31 includes a sun gear 32, a plurality of planetary gears 33, and a ring gear 34.

The sun gear 32 is connected to the first shaft 41 of the first MG1. Consequently, the first MG1 is capable of outputting a torque to the sun gear 32. Further, the first MG1 can be rotationally driven by a torque inputted to the first MG1 (the first shaft 41) from the sun gear 32. The first MG1 is rotationally driven by the torque received from the sun gear 32 to thereby be able to generate electric power.

Each of the plurality of planetary gears 33 is engaged with the sun gear 32 and the ring gear 34. The rotating shaft (rotation shaft) of the planetary gear 33 is provided in a planetary carrier 35. The planetary carrier 35 is rotatably supported coaxially with the sun gear 32. Accordingly, the planetary gear 33 can revolve round the outer periphery of the sun gear 32 while rotating. The planetary carrier 35 is connected to the crankshaft 25 of the engine 20. Therefore, the planetary gear 33 can be rotationally driven with a torque inputted to the planetary carrier 35 from the crankshaft 25.

The ring gear 34 is rotatably supported coaxially with the sun gear 32.

As described above, the planetary gear 33 is engaged with the sun gear 32 and the ring gear 34. Accordingly, when a torque is inputted to the sun gear 32 from the planetary gear 33, the sun gear 32 is rotationally driven with the torque. When a torque is inputted to the ring gear 34 from the planetary gear 33, the ring gear 34 is rotationally driven with the torque. Conversely, when a torque is inputted to the planetary gear 33 from the sun gear 32, the planetary gear 33 is rotationally driven with the torque. When a torque is inputted to the planetary gear 33 from the ring gear 34, the planetary gear 33 is rotationally driven with the torque.

The ring gear 34 is connected to the second shaft 42 of the second MG2 via a ring gear carrier 36. Consequently, the second MG2 is capable of outputting a torque to the ring gear 34. In addition, the second MG2 can be rotationally driven with a torque inputted to the second MG2 (the second shaft 42) from the ring gear 34. The second MG2 is rotationally driven with the torque received from the ring gear 34 to thereby be able to generate electric power.

Further, the ring gear 34 is connected to an output gear 37 via the ring gear carrier 36. Consequently, the output gear 37 can be rotationally driven with a torque received from the ring gear 34. The ring gear 34 can be rotationally driven with a torque received from the output gear 37.

The driving force transmission mechanism 50 includes a gear train 51, a differential gear 52, and a drive shaft 53.

The gear train 51 connects the output gear 37 and the differential gear 52 using a gear mechanism such that power can be transmitted therebetween. The differential gear 52 is attached to the drive shaft 53. Drive wheels 54 are attached to both ends of the drive shaft 53. Consequently, a torque from the output gear 37 is transmitted to the drive wheels 54 via the gear train 51, the differential gear 52, and the drive shaft 53. With the torque transmitted to the drive wheels 54, the HV 10 is capable of running.

The first inverter 61 is electrically connected to the first MG1 and the step-up converter 63. Consequently, when the first MG1 generates electric power, the electric power generated by the first MG1 is supplied to the battery 64 via the first inverter 61 and the step-up converter 63. Conversely, the first MG1 is rotationally driven with electric power supplied from the battery 64 via the step-up inverter 63 and the first inverter 61.

The second inverter 62 is electrically connected to the second MG2 and the step-up converter 63. Consequently, when the second MG2 generates electric power, the electric power generated by the second MG2 is supplied to the battery 64 via the second inverter 62 and the step-up converter 63. Conversely, the second MG2 is rotationally driven with electric power supplied from the battery 64 via the step-up converter 63 and the second inverter 62.

The electric power generated by the first MG1 can be supplied directly to the second MG2. In addition, the electric power generated by the second MG2 can be supplied directly to the first MG1.

In the embodiment, the battery 64 is a lithium-ion battery. Note that the battery 64 may be any battery as long as it is a chargeable/dischargeable electric power storage device, and the battery 64 may also be a nickel-metal hydride battery or other secondary batteries.

The power management ECU 70 (hereinafter referred to as "a PMECU 70") is connected to the battery ECU 71, the motor ECU 72, and the engine ECU 73, and is capable of information exchange with them through communication.

The PMECU 70 is connected to a power switch 81, a shift position sensor 82, an accelerator operation amount sensor 83, a brake switch 84, and a vehicle speed sensor 85. The PMECU 70 receives output signals generated by these sensors.

The power switch 81 is a switch for activating the system of the HV 10. The PMECU 70 activates the system (a Ready-On state is established) in a case where the power switch 81 is operated when a vehicle key (not shown) is inserted into a key slot (not shown) and a brake pedal is depressed. In the system activated state, the HV 10 can run.

The shift position sensor 82 generates a signal indicative of a shift position selected by a shift lever (not shown). The shift lever is provided in the vicinity of the driver's seat of the HV 10, and can be operated by a driver. The shift position includes P (parking position), R (reverse position), N (neutral position), and D (drive position).

The accelerator operation amount, sensor 83 generates an output signal indicative of the operation amount of the accelerator pedal (not shown) (an accelerator operation amount AP). The accelerator operation amount AP can be referred to as an acceleration operation amount. The brake switch 84 generates an output signal indicative of a state where a brake pedal is operated when the brake pedal (not shown) is operated. The vehicle speed sensor 85 generates an output signal indicative of a vehicle speed SPD of the HV 10. The accelerator pedal and the brake pedal are provided so as to be operable by the driver.

The PMECU 70 receives "a remaining capacity SOC (state of charge) of the battery 64" estimated and/or calculated by the battery ECU 71. The remaining capacity SOC is calculated according to a conventional method based on the total value of a current that flows into or out of the battery 64 and the voltage of the battery 64. In the calculation of the remaining capacity SOC, dischargeable electric power in a case where the battery 64 is new and is fully charged is defined as 100%. In addition, dischargeable electric power in a case where the battery 64 is completely discharged is defined as 0%. The remaining capacity SOC is an amount expressing the ratio of the present dischargeable electric power of the battery 64 to the dischargeable electric power in the case where the battery 64 is new and fully charged in "percentage (%)". The remaining capacity SOC may also be expressed in the absolute value of the remaining capacity (its unit is "Wh (watt-hour)").

The PMECU 70 receives, via the motor ECU 72, a signal indicative of the rotation speed of the first MG1 (hereinafter referred to as "an MG1 rotation speed Nm1") and a signal indicative of the rotation speed of the second MG2 (hereinafter referred to as "an MG2 rotation speed Nm2").

The MG1 rotation speed Nm1 is calculated by the motor ECU 72 based on "an output value of a resolver 97 that is provided in the first MG1 and outputs an output value corresponding to the rotation angle of the rotor of the first MG1". Similarly, the MG2 rotation speed Nm2 is calculated by the motor ECU 72 based on "an output value of a resolver 98 that is provided in the second MG2 and outputs an output value corresponding to the rotation angle of the rotor of the second MG2".

The PMECU 70 receives various output signals indicative of the engine state via the engine ECU 73. The output signals indicative of the engine state include an engine rotation speed Ne, a throttle valve opening TA, and a coolant temperature THW of the engine.

The PMECU 70 is also connected to a charger 102 and sends a command signal to the charger 102. The charger 102 includes an AC/DC converter and is connected to an inlet 101 via an electric power line. In addition, the output electric power line of the charger 102 is connected to the electric power line between the step-up converter 63 and the battery 64. The inlet 101 can be exposed to the side surface of a vehicle body, and a connector of "a power cable connected to an external power source" (not shown) is connected to the inlet 101. The PMECU 70 controls the charger 102 in a state where the connector of the power cable is connected to the inlet 101, and the battery 64 is thereby charged with electric power supplied from the external power source through the power cable (external charging). That is, the charger 102 converts alternating current electric power from the external power source supplied to the inlet 101 to direct current electric power having a predetermined voltage and supplies the direct current electric power to the battery 64.

The battery ECU 71 monitors the state of the battery 64 and calculates the remaining capacity SOC, as described above. Further, the battery ECU 71 estimates (calculates) instantaneous outputtable electric power Wout of the battery 64 according to a conventional method. The instantaneous outputtable electric power Wont is larger as the remaining capacity SOC is larger.

The motor ECU 72 is connected to the first inverter 61, the second inverter 62, and the step-up converter 63. The motor ECU 72 sends command signals to the first inverter 61, the second inverter 62, and the step-up converter 63. The motor ECU 72 controls the first MG1 by using the first inverter 61 and the step-up converter 63. In addition, the motor ECU 72 controls the second MG2 by using the second inverter 62 and the step-up converter 63.

The engine ECU 73 is connected to the throttle valve actuator 22a, each fuel injection valve 23, each ignition device 24, and the EGR valve 29a. The throttle valve actuator 22a, the fuel injection valve 23, the ignition device 24, and the EGR valve 29a are engine actuators. The engine ECU 73 sends command signals to the throttle valve actuator 22a, the fuel injection valve 23, the ignition device 24, and the EGR valve 29a. Further, the engine ECU 73 is connected to an air flow meter 91, a throttle valve opening sensor 92, an intake pressure sensor 93, a coolant temperature sensor 94, an engine rotation speed sensor 95, and an air-fuel ratio sensor 96. The engine ECU 73 receives output signals generated by the air flow meter 91, the throttle valve opening sensor 92, the intake pressure sensor 93, the coolant temperature sensor 94, the engine rotation speed sensor 95, and the air-fuel ratio sensor 96.

The air flow meter 91 measures the amount of air sucked into the engine 20 per unit time and outputs a signal indicative of the air amount (an intake air flow rate) Ga. The throttle valve opening sensor 92 detects the opening of the throttle valve 22 (a throttle valve opening). The throttle valve opening sensor 92 outputs a signal indicative of the detected throttle valve opening TA.

The intake pressure sensor 93 detects the pressure in the intake passage portion at the position on the downstream side of the throttle valve 22. The intake pressure sensor 93 outputs a signal indicative of the detected intake pipe pressure Pm. The coolant temperature sensor 94 detects the temperature of the coolant of the engine 20. The coolant temperature sensor 94 outputs a signal indicative of the detected coolant temperature THW. The coolant temperature THW is a parameter indicative of the warm-up state of the engine 20 and is also a parameter indicative of the temperature of the catalyst 28.

The engine rotation speed sensor 95 generates a pulse signal every time the crankshaft 25 of the engine 20 rotates a predetermined angle. The engine ECU 73 acquires the engine rotation speed Ne based on the pulse signal.

The air-fuel ratio sensor 96 is disposed in the exhaust gas collecting portion of the exhaust manifold 26 and at the position on the upstream side of the upstream-side three-way catalyst 28. The air-fuel ratio sensor 96 is what is called "a limiting current type wide range air-fuel ratio sensor". The air-fuel ratio sensor 96 detects the air-fuel ratio of exhaust gas. The air-fuel ratio sensor 96 outputs an output value Vabyfs corresponding to the detected air-fuel ratio (a detected air-fuel ratio) abyfs of the exhaust gas. The engine ECU 73 applies the output value Vabyfs to a look-up table Mapabyfs (Vabyfs) to thereby acquire the detected air-fuel ratio abyfs.

The engine ECU 73 controls the engine 20 by transmitting command signals to "the throttle valve actuator 22a, the fuel injection valve 23, the EGR valve 29a, and the ignition device 24 (further the VVT system that is not shown)" based on the signals acquired from the sensors and the command from the PMECU 70. A cam position sensor (not shown) is provided in the engine 20. The engine ECU 73 acquires a crank angle (an absolute crank angle) of the engine 20 based on signals from the engine rotation speed sensor 95 and the cam position sensor. The absolute crank angle is determined relative to the intake top dead center of a specific cylinder.

Next, the operation of the HV 10 (a driving force control) will be described. Processes described hereinbelow are executed by "the CPU of the PMECU 70 and the CPU of the engine ECU 73". In order to simplify the description, hereinbelow, the CPU of the PMECU 70 is referred to as "a PM" and the CPU of the engine ECU 73 is referred to as "an EG".

The HV 10 "controls the output torque of the engine 20 and the output torque of the second MG2 while maximizing the efficiency of the engine 20" to thereby apply a torque equal to "a user request torque" to the drive shaft 53. The user request torque is a torque determined according to the accelerator operation amount of the user, and the request for the torque is made to the drive shaft 53 of the vehicle. At this point, the HV 10 operates the engine 20 at "an optimum engine operation point determined according to an engine generation torque Te and the engine rotation speed Ne". "The optimum engine operation point" is an engine operation point where the output of the engine 20 satisfies the engine request output and the efficiency of the engine 20 is maximized.

The HV 10 controls the engine 20, the first MG1, and the second MG2 while associating them with each other. In addition, as described above, the vehicle 10 is capable of running in each of the EV mode and the HV mode.

The EV mode is executed when the remaining capacity SOC is larger than a mode switching threshold value SOCEVtoHV after external charging. The EV mode is a mode in which the vehicle 10 is caused to run with "the electric running" having higher priority than "the hybrid running". The electric running is "a first operation state in which all of the driving force of the vehicle 10 is generated from the second MG2 by driving the second MG2 without operating the engine 20". The hybrid running is "a second operation state in which the driving force of the vehicle 10 is generated from both of the engine 20 and the second MG2 by operating the engine 20 and driving the second MG2".

The HV mode is executed when the remaining capacity SOC becomes smaller than the mode switching threshold value SOCEVtoHV during the running in the EV mode. In comparison with the EV mode, the HV mode is a mode in which the vehicle 10 is caused to run with the second operation state having higher priority than the first operation state. These modes are conventional and are described in, e.g., Japanese Patent Application Publication No. 2011-57115 (JP-2011-57115 A) and Japanese Patent Application Publication No. 2011-57116 (JP-2011-57116 A). These are incorporated in the specification of the invention by reference.

The basic content of the control in the HV mode is described in detail in, e.g., Japanese Patent Application Publication No. 2009-126450 (JP-2009-126450 A) (US 2010/0241297 A) and Japanese Patent Application Publication No. 9-308012 (JP-9-308012 A) (U.S. Pat. No. 6,131,680 filed on Mar. 10, 1997). They are incorporated in the specification of the invention by reference.

Hereinbelow, a detailed description will be given of the control content when the HV 10 runs in the EV mode.

Figure 2:
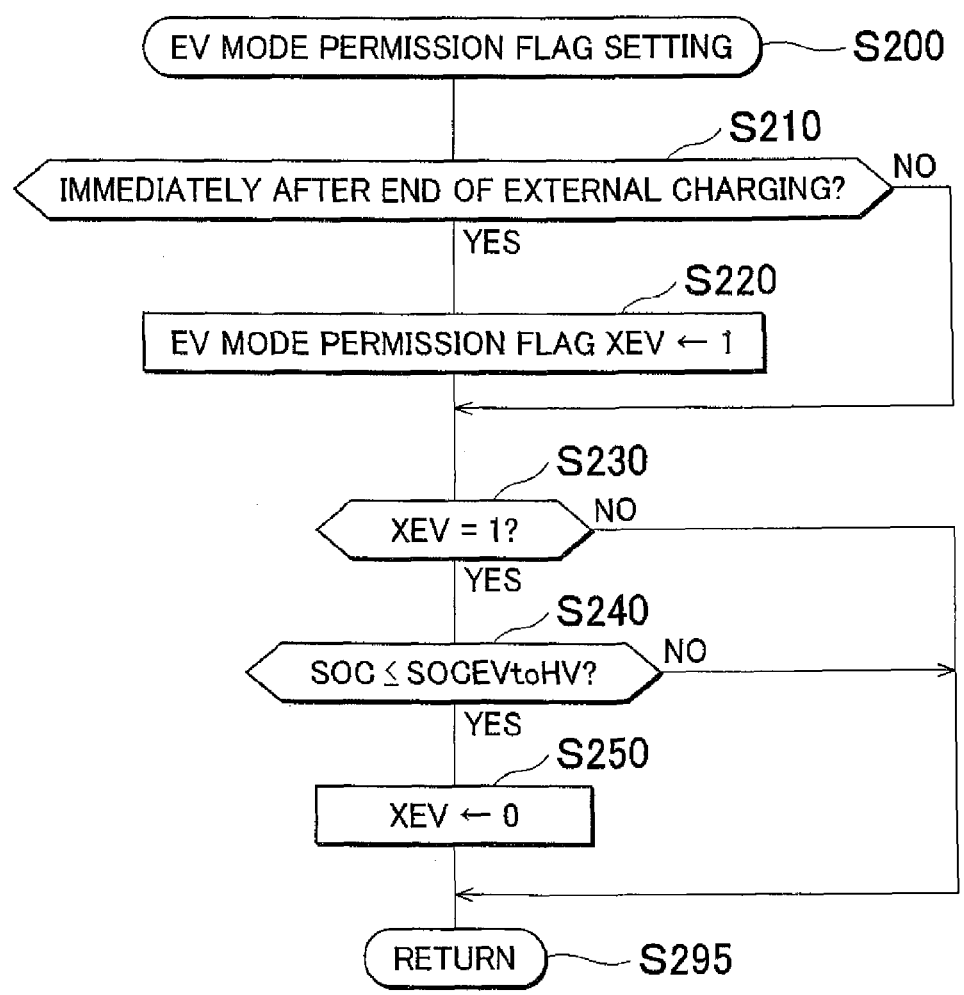
FIG. 2 is a flowchart showing a routine executed by a central processing unit (CPU) of a power management electric control unit (ECU) of the HV shown in FIG. 1.

FIG. 2 is a flowchart showing "an EV mode permission flag setting routine". The PM executes "the EV mode permission flag setting routine" at predetermined time intervals. Consequently, the PM starts a process from Step 200 of FIG. 2 at an appropriate timing, and proceeds to Step 210 to determine "whether or not the present time point is immediately after the end of the external charging".

When the present time point is immediately after the end of the external charging, the determination result of the PM becomes "Yes" in Step 210, and the PM proceeds to Step 220. In Step 220, the PM sets the value of an EV mode permission flag XEV to "1". Subsequently, the PM proceeds to Step 230. In contrast to this, when the present time point is not immediately after the end of the external charging, the determination result of the PM becomes "No" in Step 210, and the PM proceeds directly to Step 230.

In Step 230, the PM determines whether or not the value of the EV mode permission flag XEV is "1". When the value of the EV mode permission flag XEV is not "1", the determination result of the PM becomes "No" in Step 230, and the PM proceeds directly to Step 295 to temporarily end the routine.

In contrast to this, when the value of the EV mode permission flag XEV is "1", the determination result of the PM becomes "Yes" in Step 230, and the PM proceeds to Step 240. In Step 240, the PM determines whether or not the remaining capacity SOC is not more than the mode switching threshold value SOCEVtoHV. When the remaining capacity SOC is more than the mode switching threshold value SOCEVtoHV, the determination result of the PM becomes "No" in. Step 240, and the PM proceeds directly to Step 295 to temporarily end the routine.

In contrast to this, when the remaining capacity SOC is not more than the mode switching threshold value SOCEVtoHV, the determination result of the PM becomes "Yes" in Step 240, and the PM proceeds to Step 250. In Step 250, the PM sets the value of the EV mode permission flag XEV to "0". Thereafter, the PM proceeds to Step 295 and temporarily ends the routine.

Thus, the value of the EV mode permission flag XEV is set to "1" immediately after the external charging, and is set to "0" when the remaining capacity SOC is reduced to the mode switching threshold value SOCEVtoHV.

Figure 3:
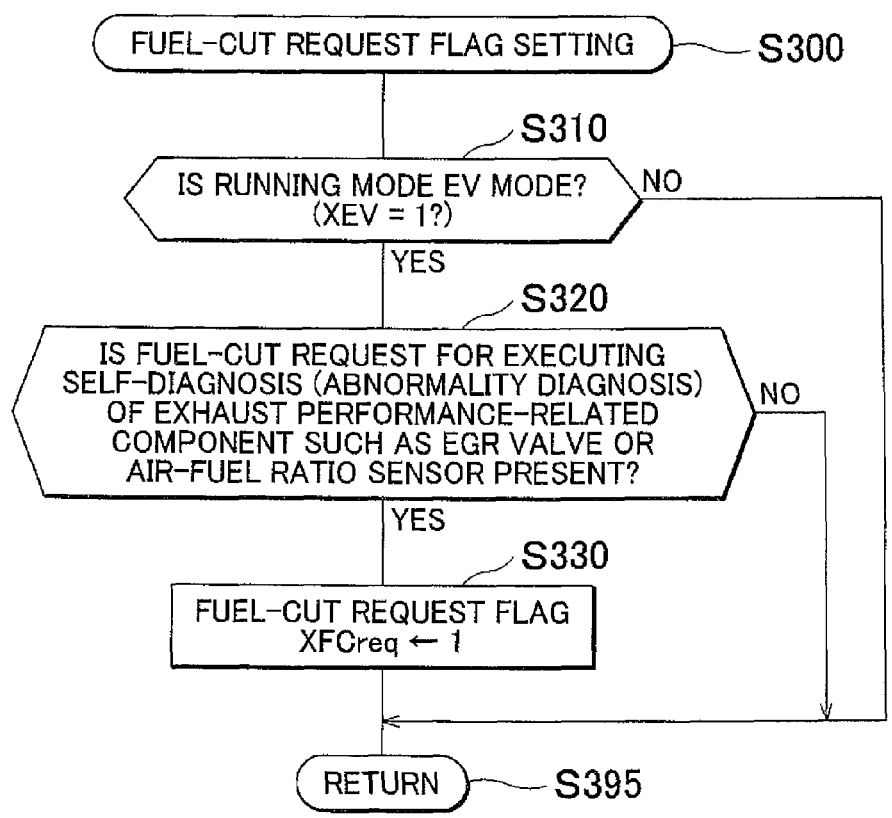
FIG. 3 is a flowchart showing a routine executed by a CPU of an engine ECU shown in FIG. 1.

FIG. 3 is a flowchart showing "a fuel-cut request flag setting routine". The EG executes "the fuel-cut request flag setting routine" at predetermined time intervals. Consequently, the EG starts a process from Step 300 of FIG. 3 at an appropriate timing, and proceeds to Step 310 to determine "whether or not the value of the EV mode permission flag XEV is "1"". That is, the EG determines "whether or not the present running mode is the EV mode".

When the value of the EV mode permission flag XEV is not "1", the determination result of the EG becomes "No" in Step 310, and the EG proceeds to Step 395 to temporarily end the routine.

In contrast to this, when the value of the EV mode permission flag XEV is "1", the determination result of the EG becomes "Yes" in Step 310, and the EG proceeds to Step 320. In Step 320, the EG determines whether or not a fuel-cut request for executing a self-diagnosis (an abnormality diagnosis) of an exhaust performance-related component is present. The exhaust performance-related component is a component that significantly influences an emission of the engine 20 when the component is brought into an abnormal state such as, e.g., the EGR valve 29a, the air-fuel ratio sensor 96. That is, the exhaust performance-related component is a component related to exhaust qualities.

The self-diagnosis of the EGR valve 29a is executed in, e.g., the following manner. In a case where the engine 20 is in a fuel-cut operation (fuel supply stop operation) state, the state of the EGR valve 29a is changed from a completely closed state to a state other than the completely closed state or the other way around, and it is monitored whether or not the intake pipe pressure Pm changes. In this case, when the intake pipe pressure Pm does not change, the EG determines that an abnormality occurs in the EGR valve 29a. The fuel-cut operation is an operation in which the engine 20 is operated in a fuel-cut state. The fuel cut means that the fuel supply to the engine 20 is stopped.

The self-diagnosis of the air-fuel ratio sensor 96 is executed in, e.g., the following manner. In a case where the operation state of the engine 20 is changed from a state other than the fuel-cut operation state to the fuel-cut operation state, it is monitored whether or not a time required until "the air-fuel ratio (the detected air-fuel ratio) abyfs indicated by the output value Vabyfs" reaches a predetermined lean air-fuel ratio from the time point of change of the operation state (a change time) is longer than a predetermined time. In this case, when the change time is longer than the predetermined time, the EG determines that the abnormality occurs in the air-fuel ratio sensor 96.

The EG generates the fuel-cut request until the self-diagnosis of the exhaust performance-related component executed in the fuel-cut operation state is completed after turning-on of the ignition key switch of this time (after the start of the running of the HV of this time). The EG may generate the fuel-cut request when the self-diagnosis of the exhaust performance-related component is not completed after one start of the engine.

In Step 320, the EG determines whether or not the fuel-cut request is present. When the fuel-cut request is present, the determination result of the EG becomes "Yes" in Step 320, and the EG proceeds to Step 330. In Step 330, the EG sets the value of a fuel-cut request flag XFCreq to "1". The value of the fuel-cut request flag XFCreq is transmitted to the PMECU 70 by communications. Thereafter, the EG proceeds to Step 395 and temporarily ends the routine. In contrast to this, when the fuel-cut request is not present, the determination result of the EG becomes "No" in Step 320, and the EG proceeds directly to Step 395 to temporarily end the routine. Note that the value of the fuel-cut request flag XFCreq is set to "0" when the system of the HV 10 is activated.

Figure 4:
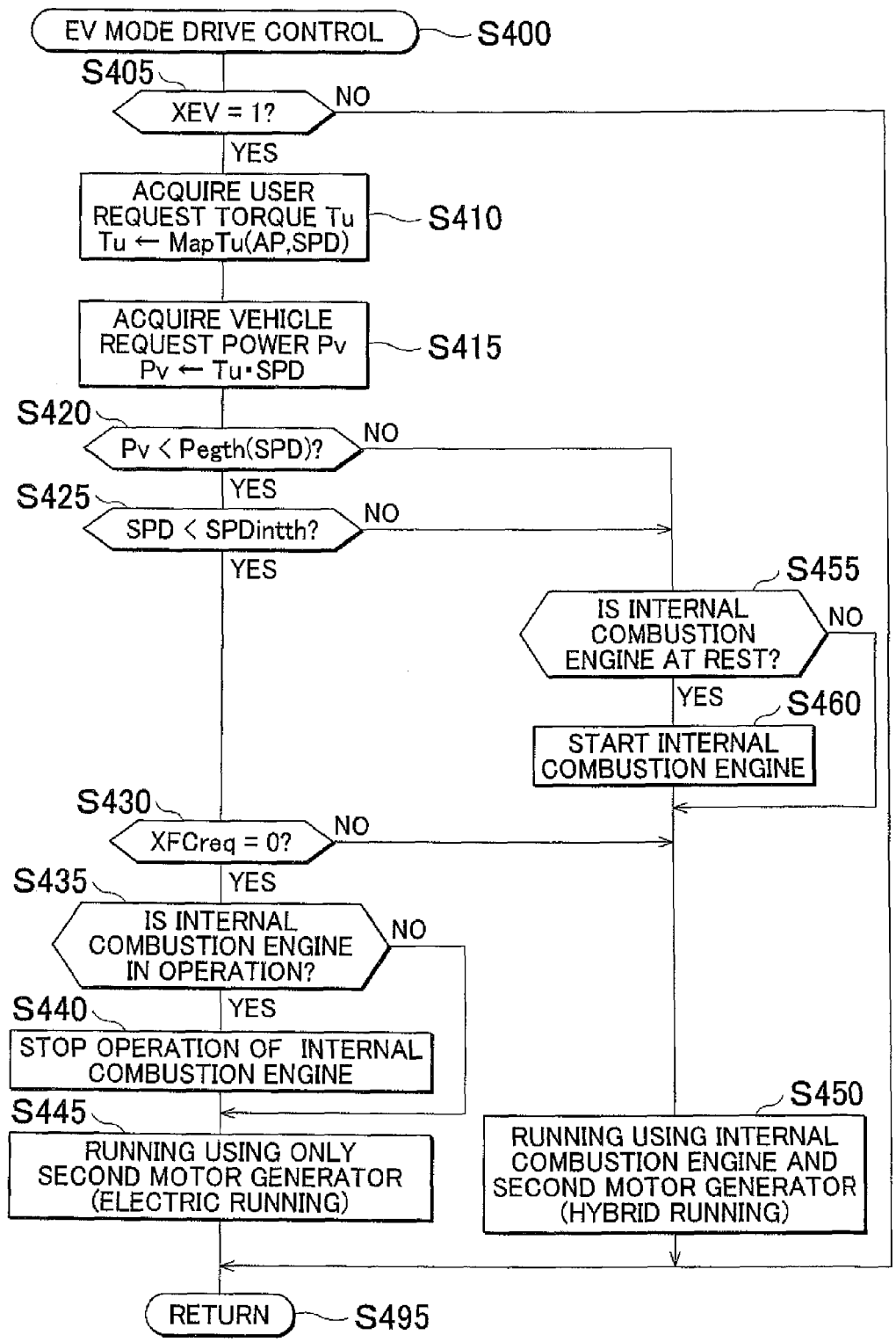
FIG. 4 is a flowchart showing a routine executed by the CPU of the power management ECU shown in FIG. 1.

FIG. 4 is a flowchart showing "an EV mode drive control routine". The PM executes "the EV mode drive control routine" at predetermined time intervals while referring to the value of the EV mode permission flag XEV and the value of the fuel-cut request flag XFCreq.

The PM starts a process from Step 400 of FIG. 4 at an appropriate timing, and proceeds to Step 405 to determine "whether or not the value of the EV mode permission flag XEV is "1"". When the value of the EV mode permission flag XEV is not "1", the determination result of the PM becomes "No" in Step 405, and the PM proceeds directly to Step 495 to temporarily end the routine.

Herein, the value of the EV mode permission flag XEV is assumed to be "1". In this case, the determination result of the PM becomes "Yes" in Step 405, and the PM proceeds to Step 410. In Step 410, the PM determines a user request torque. Tu based on the accelerator operation amount AP and the vehicle speed SPD. More specifically, the user request torque Tu is determined so as to be larger as the accelerator operation amount AP is larger, and smaller as the vehicle speed SPD is higher.

Next, the PM proceeds to Step 415 and acquires the product of the user request torque Tu and the vehicle speed SPD as vehicle request power Pv. Subsequently, the PM proceeds to Step 420 and determines whether or not the vehicle request power Pv is smaller than an engine start power threshold value Pegth. As indicated by a thick solid line in FIG. 5, the engine start power threshold value Pegth changes according to the vehicle speed SPD. Further, the engine start power threshold value Pegth also changes according to the instantaneous outputtable electric power Wout of the battery 64.

Figure 5:
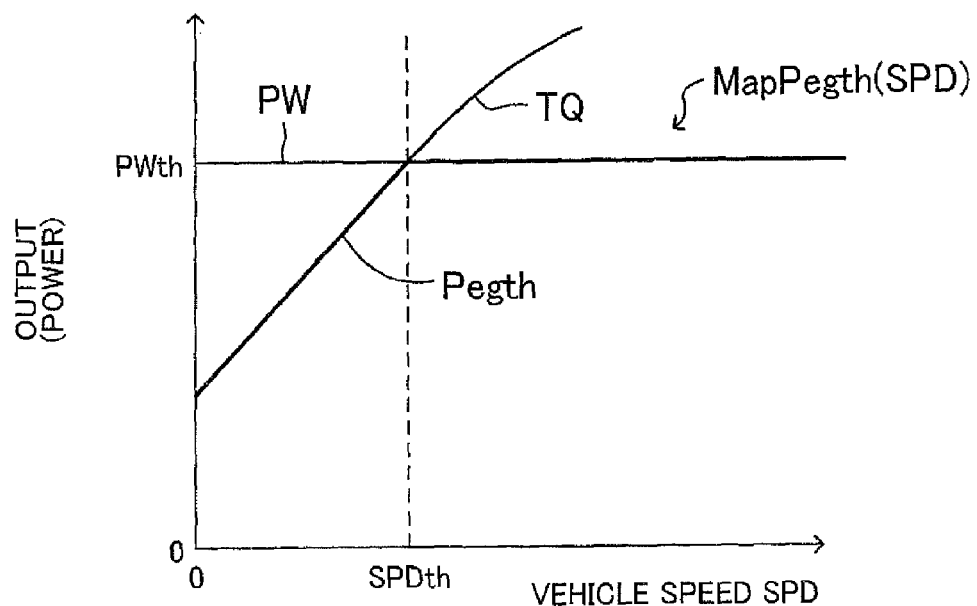
FIG. 5 is a graph showing an engine start power threshold value during an EV mode of the HV shown in FIG. 1.

That is, a line TQ of FIG. 5 represents a torque requirement threshold value that is determined in correspondence to the upper limit value of the torque outputted by the second MG2. A line PW of FIG. 5 represents a power requirement threshold value that is determined in correspondence to the instantaneous outputtable electric power Wout of the battery 64. That is, the power requirement threshold value is a value representing the relationship between the torque and the vehicle speed. The torque is obtained when all of the electric power that the battery 64 can supply is supplied to the second MG2. Consequently, the power requirement threshold value fluctuates according to instantaneous electric power that the battery 64 can supply to the second MG2. In addition, the engine start power threshold value Pegth is determined according to the smaller one of the torque requirement threshold value and the power requirement threshold value.

When the vehicle request power Pv is smaller than the engine start power threshold value Pegth, the determination result of the PM becomes "Yes" in Step 420, and the PM proceeds to Step 425. In Step 425, the PM determines whether or not the vehicle speed SPD is lower than an intermittent operation permission vehicle speed SPDintth (an engine start vehicle speed threshold value SPDuplmt).

When the vehicle speed SPD is lower than the intermittent operation permission vehicle speed SPDintth, the determination result of the PM becomes "Yes" in Step 425, and the PM proceeds to Step 430. In Step 430, the PM determines whether or not the value of the fuel-cut request flag XFCreq is "0".

At this point, when the value of the fuel-cut request flag XFCreq is "0", the determination result of the PM becomes "Yes" in Step 430, and the PM proceeds to Step 435. In Step 435, the PM determines whether or not the engine 20 is in operation. When the engine 20 is in operation, the determination result of the PM becomes "Yes" in Step 435, and the PM proceeds to Step 440. In Step 440, the PM transmits a command for stopping the operation of the engine 20 to the engine ECU 73. Thereafter, the PM proceeds to Step 445. In contrast to this, when the engine 20 is not in operation, the determination result of the PM becomes "No" in Step 435, and the PM proceeds directly to Step 445.

In Step 445, the PM controls the second MG2 such that the vehicle request power Pv is satisfied. As a result, the HV 10 performs the running that uses only the output of the second MG2 (i.e., the electric running).

On the other hand, in a case where the value of the fuel-cut request flag XFCreq is "1" at the time point at which the PM executes the process of Step 430, the determination result of the PM becomes "No" in Step 430, and the PM proceeds to Step 450. In Step 450, the PM controls "the engine 20 and the second MG2" such that the vehicle request power Pv is satisfied. That is, the HV 10 performs the running that uses the outputs of both of the engine 20 and the second MG2 (i.e., the hybrid running). In this case, the value of the fuel-cut request flag XFCreq is "1". Consequently, if the fuel cut condition that the accelerator operation amount AP is "0" or the like is satisfied, there are cases where the engine 20 is operated in the fuel-cut operation state according to "an internal combustion engine control routine" described later. When the determination result of the PM becomes "No" in Step 430, the PM may proceed to Step 455 described later.

When the PM proceeds to Step 450 when the fuel-cut request flag XFCreq is not "1", the engine 20 is operated at the optimum engine operation point. With this, a torque corresponding to the shortage of the user request torque Tu applied to the drive shaft 53 is generated from the second MG2. Thereafter, the PM proceeds to Step 495, and temporarily ends the routine.

Further, in a case where the vehicle request power Pv is not less than the engine start power threshold value Pegth at the time point at which the PM executes the process of Step 420, the determination result of the PM becomes "No" in Step 420, and the PM proceeds to Step 455. In Step 455, the PM determines whether or not the engine 20 is at rest. The rest of the engine 20 means that the engine rotation speed Ne is "0".

When the engine 20 is at rest, the determination result of the PM becomes "Yes" in Step 455, and the PM proceeds to Step 460. In Step 460, the PM starts the engine 20 (starts the operation of the engine 20), and proceeds to Step 450. In contrast to this, when the engine 20 is in operation, the determination result of the PM becomes "No" in Step 455, and the PM proceeds directly to Step 450. As a result, the HV 10 performs the hybrid running.

In a case where the vehicle speed SPD is not less than the intermittent operation permission vehicle speed SPDintth at the time point at which the PM executes the process of Step 425, the determination result of the PM becomes "No" in Step 425, and the PM proceeds to Step 455 and Steps subsequent thereto. Consequently, in this case as well, the HV 10 performs the hybrid running.

Thus, when the vehicle request power Pv is smaller than the engine start power threshold value Pegth, the vehicle speed SPD is lower than the intermittent operation permission vehicle speed SPDintth, and the value of the fuel-cut request flag XFCreq is "0", the HV 10 performs the electric running. In contrast to this, even when the vehicle request power Pv is smaller than the engine start power threshold value Pegth and the vehicle speed SPD is lower than the intermittent operation permission vehicle speed SPDintth, when the value of the fuel-cut request flag XFCreq is "1", the HV 10 performs the hybrid running while operating the engine 20 in the fuel-cut state.

Figure 6:
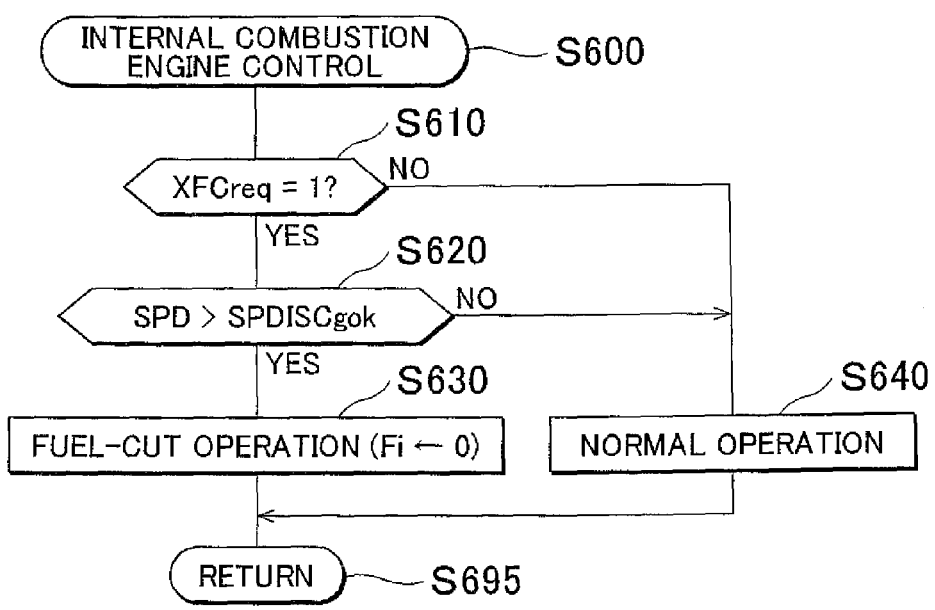
FIG. 6 is a flowchart showing a routine executed by the CPU of the engine ECU shown in FIG. 1.

FIG. 6 is a flowchart showing "the internal combustion engine control routine". The EG executes "the internal combustion engine control routine" at predetermined time intervals. Consequently, the EG starts a process from Step 600 of FIG. 6 at an appropriate timing, and proceeds to Step 610 to determine whether or not the value of the fuel-cut request flag XFCreq is "1".

When the value of the fuel-cut request flag XFCreq is "1", the determination result of the EG becomes "Yes" in Step 610, and the EG proceeds to Step 620. In Step 620, the EG determines whether or not the vehicle speed SPD is higher than a learning permission vehicle speed SPDISCgok. The learning permission vehicle speed SPDISCgok is lower than the intermittent operation permission vehicle speed SPDintth. When the engine 20 is operated in the idle state in a state where the vehicle speed SPD is lower than the learning permission vehicle speed SPDISCgok, the idle operation is stable. Therefore, the vehicle speed SPD is a vehicle speed that allows learning of an idle operation control learned value.

When the vehicle speed SPD is higher than the learning permission vehicle speed SPDISCgok, the determination result of the EG becomes "Yes" in Step 620, and the EG proceeds to Step 630. In Step 630, the EG operates the engine 20 in the fuel-cut state. That is, the EG sets a fuel injection amount Fi to "0". Thereafter, the EG proceeds to Step 695, and temporarily ends the routine. Note that the EG may operate the engine 20 in the fuel-cut state only when a fuel cut condition that the value of the fuel-cut request flag XFCreq is "1", the vehicle speed SPD is higher than the learning permission vehicle speed SPDISCgok, and the accelerator operation amount AP is "0" is satisfied.

In contrast to this, when the value of the fuel-cut request flag XFCreq is "0", the determination result of the EG becomes "No" in Step 610, and the EG proceeds to Step 640. In Step 640, the EG operates the engine 20 such that the torque corresponding to the request from the PMECU 70 is outputted. Further, when the vehicle speed SPD is not more than the learning permission vehicle speed SPDISCgok, the determination result of the EG becomes "No" in Step 620, and the EG proceeds to Step 640. In Step 640, the EG operates the engine 20 such that the torque corresponding to the request from the PMECU 70 is outputted. Consequently, during the operation of the engine 20, for example, when the accelerator operation amount AP is "0" and therefore the vehicle request power Pv is small, the engine 20 is operated in the idle state.

Figure 7:
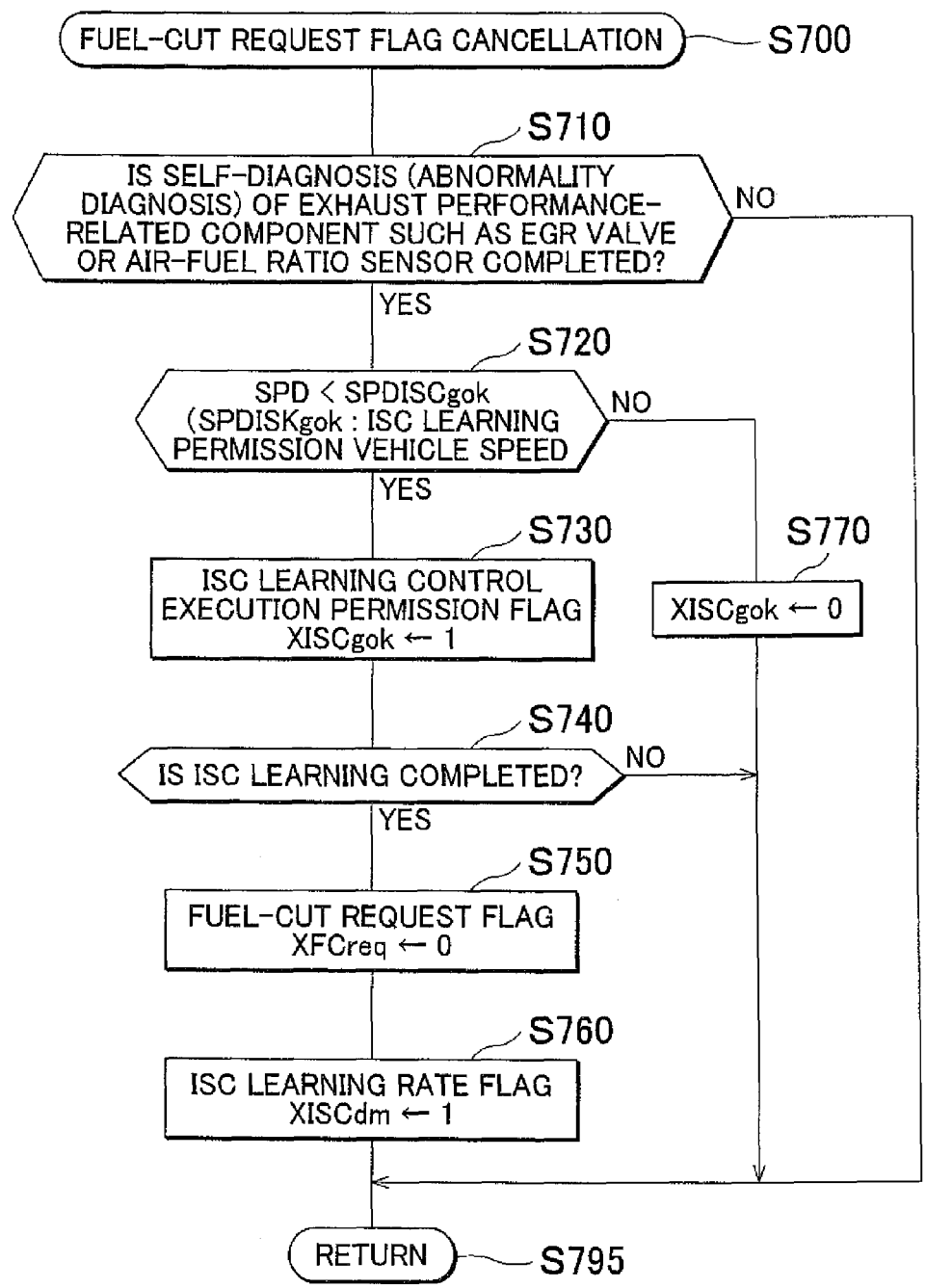
FIG. 7 is a flowchart showing a routine executed by the CPU of the engine ECU shown in FIG. 1.

FIG. 7 is a flowchart showing "a fuel-cut request flag cancellation routine". The EG executes "the fuel-cut request flag cancellation routine" at predetermined time intervals. Consequently, the EG starts a process from Step 700 of FIG. 7 at an appropriate timing and proceeds to Step 710 to determine whether or not "the self-diagnosis (the abnormality diagnosis) of the exhaust performance-related component performed during the fuel-cut operation is completed after the present activation of the system". At this point, when the self-diagnosis of the exhaust performance-related component is not completed, the determination result of the EG becomes "No" in Step 710, and the EG proceeds directly to Step 795 to temporarily end the routine.

In contrast to this, when the self-diagnosis of the exhaust performance-related component is completed, the determination result of the EG becomes "Yes" in Step 710, and the EG proceeds to Step 720. In Step 720, the EG determines whether or not the vehicle speed SPD is lower than the learning permission vehicle speed SPDISCgok. When the vehicle speed SPD is lower than the learning permission vehicle speed SPDISCgok, the determination result of the EG becomes "Yes" in Step 720, and the EG proceeds to Step 730. In Step 730, the EG sets the value of an ISC learning control execution permission flag XISCgok to "1".

When the engine 20 is in the idle operation state (when a target engine rotation speed Ne* is an idle rotation speed), the EG feedback-controls the throttle valve opening TA such that the engine rotation speed Ne matches the target engine rotation speed Ne* (i.e., a target idle rotation speed) according to a routine that is not shown. Further, in the routine, the EG monitors the value of the ISC learning control execution permission flag XISCgok. When the value of the ISC learning control execution permission flag XISCgok is "1" and the engine 20 is in the idle operation state, a value corresponding to the throttle valve opening TA (the throttle valve opening TA itself or a primary delay value of the throttle valve opening TA) is learned as the idle operation control learned value (stored in the backup RAM). The idle operation control learned value is used as the initial value of the throttle valve TA or the like when the operation state of the engine 20 is brought into the idle operation state from the state other than the idle operation state.

Next, the EG proceeds to Step 740 and determines whether or not the learning of the idle operation control learned value is completed. For example, when the idle operation control learned value is learned for a predetermined time or longer, the EG determines that the learning of the idle operation control learned value is completed. When the learning of the idle operation control learned value is not completed, the determination result of the EG becomes "No" in Step 740, and the EG proceeds directly to Step 795 to temporarily end the routine.

In contrast to this, when the learning of the idle operation control learned value is completed, the determination result of the EG becomes "Yes" in Step 740, and the EG proceeds to Step 750. In Step 750, the EG sets the value of the fuel-cut request flag XFCreq to "0". Subsequently, the EG proceeds to Step 760 and sets the value of an ISC learning rate flag XISCdm to "1". Thereafter, the EG proceeds to Step 795 and temporarily ends the routine.

In Step 720, when the vehicle speed SPD is not less than the learning permission vehicle speed SPDISCgok, the determination result of the EG becomes "No", and the EG proceeds to Step 770. In Step 770, the EG sets the value of the ISC learning control execution permission flag XISCgok to "0", and proceeds directly to Step 795 to temporarily end the routine. Consequently, in this case, even when the engine 20 is operated in the idle state, the learning of the idle operation control learned value is not executed.

FIG. 8 is a flowchart showing "an ISC rate calculation routine". The EG executes "the ISC rate calculation routine" at predetermined time intervals. The ISC rate is the rate of the frequency of completion of the learning of the idle operation control learned value to the frequency of the engine start (hereinafter referred to as "an ISC learning frequency total value").

The EG starts a process from Step 800 of FIG. 8 at an appropriate timing, and proceeds to Step 810 to determine "whether or not the present time point is immediately after the start of the engine 20". When the present time point is immediately after the start of the engine 20, the determination result of the EG becomes "Yes" in Step 810, and the EG proceeds to Step 820. In Step 820, the EG sets the value of an engine start flag XEGst to "1". Thereafter, the EG proceeds to Step 895 and temporarily ends the routine.

In contrast to this, when the time point at which the EG executes the process of Step 810 is not immediately after the start of the engine 20, the determination result of the EG becomes "No" in Step 810, and the EG proceeds to Step 830. In Step 830, the EG determines whether or not the present time point is immediately after the stop of the operation of the engine 20. When the present time point is not immediately after the stop of the operation of the engine 20, the determination result of the EG becomes "No" in Step 830, and the EG proceeds directly to Step 895 to temporarily end the routine.

In contrast to this, when the time point at which the EG executes the process of Step 830 is immediately after the stop of the engine 20, the determination result of the EG becomes "Yes" in Step 830. Subsequently, the EG performs processes of Steps 840 to 880 described below sequentially, and proceeds to Step 895 to temporarily end the routine.

In step 840, the EG adds the value of the engine start flag XEGst (i.e., "1") to a present start frequency total value SEG to thereby calculate the new start frequency total value SEG. In step 850, the EG adds the value of the ISC learning rate flag XISCdm ("0" or "1") to the present ISC learning frequency total value SISCdm to thereby calculate the new ISC learning frequency total value SISCdm.

In step 860, the EG divides the ISC learning frequency total value SISCdm by the start frequency total value SEG to thereby calculate an ISC learning rate ISCgrate. In step 870, the EG sets the value of the engine start flag XEGst to "0". In step 880, the EG sets the value of the ISC learning rate flag XISCdm to "0".

Thus, as described above, on the HV 10 according to the embodiment of the invention, the internal combustion engine 20 and the motor (the second MG2) are mounted as the drive sources. The HV 10 has a drive control section (Steps 445 and 450 of FIG. 4), a self-diagnosis section (see Step 710 of FIG. 7), a fuel-cut request section (Steps 320 and 330 of FIG. 3), and an idle operation control section (see Steps 720 to 740 of FIG. 7). In a case where the vehicle speed SPD of the HV is not more than the predetermined intermittent operation permission vehicle speed SPDintth, when the predetermined engine operation stop condition (the condition that the vehicle request power Pv is smaller than the engine start power threshold value Pegth) is satisfied, the drive control section stops the operation of the engine 20 (Steps 420, 435, and 440 of FIG. 4). In addition, when the predetermined engine start condition (the condition that the vehicle request power Pv is not less than the engine start power threshold value Pegth) is satisfied, the drive control section starts the operation of the engine 20 (Steps 420, 455, and 460 of FIG. 4) (i.e., performs the intermittent operation), and controls the torque generated by the engine 20 and the torque generated by the second MG2 to thereby cause the HV to run. The self-diagnosis section executes the self-diagnosis of the component related to the exhaust performance of the engine 20 during the fuel-cut operation of the engine. The fuel-cut request section generates the fuel-cut request for operating the engine in the fuel-cut state in order to execute the self-diagnosis to the drive control section. The idle operation control section feedback-controls the control parameter that adjusts the rotation speed of the engine such that the rotation speed Ne of the engine is maintained at the target idle rotation speed when the engine 20 is operated in the idle state by the drive control section. In addition, the idle operation control section learns the value corresponding to the control parameter as the idle operation control learned value in a state in which the vehicle speed is not more than the predetermined leaning permission vehicle speed that is lower than the intermittent operation permission vehicle speed and the engine 20 is operated in the idle state.

Further, the fuel-cut request section continues to generate the fuel-cut request until the learning of the idle operation control learned value is completed even after the end of the self-diagnosis (see FIG. 3 and Steps 710, 740, and 750 of FIG. 7). In the case where the fuel-cut request is generated, the drive control section continues the operation of the engine while operating the engine in the fuel-cut state (see Steps 430 and 450 of FIG. 4) without stopping the operation of the engine (when the fuel cut condition that the accelerator operation amount AP is "0" is satisfied) even when the engine operation stop condition is satisfied.

Consequently, the fuel-cut request does not disappear until the learning of the idle operation control learned value is completed, and hence the engine is continuously operated. Therefore, opportunity for the operation of the engine in the idle state at the time point at which the vehicle speed SPD becomes equal to or lower than the learning permission vehicle speed is increased. Accordingly, it is possible to increase opportunity of performing the learning of the idle operation control learned value.

Note that the invention is not limited to the above-described embodiment, and various modifications may be employed within the scope of the invention. For example, in the case where the HV 10 is operated in the HV mode as well, similarly to the above-described embodiment, the fuel-cut request for performing the self-diagnosis of the component related to the exhaust performance may be continued until the learning of the idle operation control learned value is completed.

What is claimed is:

1. A hybrid vehicle on which an internal combustion engine and a motor are mounted as drive sources comprising:
a drive control section that stops the internal combustion engine when a predetermined stop condition is satisfied in a case where a vehicle speed of the hybrid vehicle is not more than a predetermined first vehicle speed, and starts the internal combustion engine when a predetermined start condition is satisfied and controls a torque generated by the internal combustion engine and a torque generated by the motor;

a self-diagnosis section that executes a diagnosis of an EGR valve during a fuel-cut operation of the internal combustion engine;

a fuel-cut request section that generates to the drive control section a fuel-cut request for operating the internal combustion engine in a fuel-cut state in order to execute the diagnosis, the fuel-cut request generated before the self-diagnosis section executes the diagnosis, and when the engine is in a fuel-cut operation state, the state of the EGR valve is changed from a completely closed state to a state other than the completely closed state or vice versa, and when the intake pipe pressure does not change an abnormality is detected; and an idle operation control section that, in a case where the internal combustion engine is operated in an idle state by supplying a fuel to the internal combustion engine by the drive control section, controls a control parameter that adjusts a rotation speed of the internal combustion engine such that the rotation speed of the internal combustion engine is maintained at a target idle rotation speed, and learns a value corresponding to the control parameter as a learned value for controlling the idle operation in a state in which the vehicle speed is not more than a predetermined second vehicle speed which is lower than the first vehicle speed, the internal combustion engine includes a throttle valve and a throttle valve opening change section that changes an opening of the throttle valve, the idle operation control section controls the opening of the throttle valve as the control parameter, wherein the fuel-cut request section continues to generate the fuel-cut request until the learning is completed, the fuel-cut request section continues to generate the fuel-cut request after the self-diagnosis is completed, and the drive control section continues the fuel-cut operation of the internal combustion engine if a fuel-cut condition is satisfied in a case where the fuel-cut request is generated even when the predetermined stop condition is satisfied.

2. A hybrid vehicle on which an internal combustion engine and a motor are mounted as drive sources comprising:

a drive control section that stops the internal combustion engine when a predetermined stop condition is satisfied in a case where a vehicle speed of the hybrid vehicle is not more than a predetermined first vehicle speed, and starts the internal combustion engine when a predetermined start condition is satisfied and controls a torque generated by the internal combustion engine and a torque generated by the motor;

a self-diagnosis section that executes a diagnosis of an air-fuel ratio sensor during a fuel-cut operation of the internal combustion engine;

a fuel-cut request section that generates to the drive control section a fuel-cut request for operating the internal combustion engine in a fuel-cut state in order to execute the diagnosis, the fuel-cut request generated before the self-diagnosis section executes the diagnosis, and when the operation state of the engine is changed to the fuel-cut operation state, the self-diagnosis of the air-fuel ratio sensor monitors whether or not a time required until the detected air-fuel ratio indicated by an output value reaches a predetermined lean air-fuel ratio from a time point of change of the operation state is longer than a predetermined time, and when a change time is longer than the predetermined time then an abnormality is detected; and an idle operation control section that, in a case where the internal combustion engine is operated in an idle state by supplying a fuel to the internal combustion engine by the drive control section, controls a control parameter that adjusts a rotation speed of the internal combustion engine such that the rotation speed of the internal combustion engine is maintained at a target idle rotation speed, and learns a value corresponding to the control parameter as a learned value for controlling the idle operation in a state in which the vehicle speed is not more than a predetermined second vehicle speed which is lower than the first vehicle speed, the internal combustion engine includes a throttle valve and a throttle valve opening change section that changes an opening of the throttle valve, the idle operation control section controls the opening of the throttle valve as the control parameter, wherein the fuel-cut request section continues to generate the fuel-cut request until the learning is completed, the fuel-cut request section continues to generate the fuel-cut request after the self-diagnosis is completed, and the drive control section continues the fuel-cut operation of the internal combustion engine if a fuel-cut condition is satisfied in a case where the fuel-cut request is generated even when the predetermined stop condition is satisfied.

* * * * *